(12) United States Patent
Kanaya et al.

(10) Patent No.: US 7,980,607 B2
(45) Date of Patent: Jul. 19, 2011

(54) IMPACT ABSORBING MEMBER

(75) Inventors: Takakuni Kanaya, Anjo (JP); Hiroyuki Demizu, Anjo (JP); Kohei Hodoya, Kariya (JP)

(73) Assignees: Toyotomi Kiko Co., Ltd., Anjo-shi (JP); Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/921,164

(22) PCT Filed: Jul. 23, 2008

(86) PCT No.: PCT/JP2008/063206
§ 371 (c)(1),
(2), (4) Date: Sep. 6, 2010

(87) PCT Pub. No.: WO2010/010618
PCT Pub. Date: Jan. 28, 2010

(65) Prior Publication Data
US 2011/0012389 A1    Jan. 20, 2011

(51) Int. Cl.
*B60R 19/26* (2006.01)
(52) U.S. Cl. ............... 293/132; 296/187.03; 188/377
(58) Field of Classification Search ............ 293/102, 293/132, 133; 296/187.03, 187.09, 187.11; 188/377
See application file for complete search history.

(56) References Cited

U.S. PATENT DOCUMENTS

| 5,715,757 | A * | 2/1998 | Dannawi et al. ......... 296/187.03 |
| 7,213,867 | B2 | 5/2007 | Haneda et al. |
| 2006/0145490 | A1* | 7/2006 | Yamaguchi et al. ......... 293/132 |
| 2007/0181393 | A1* | 8/2007 | Suzuki ......................... 188/377 |

FOREIGN PATENT DOCUMENTS

| JP | 52-123926 U | 9/1977 |
| JP | 10-7032 | 1/1998 |
| JP | 2000-081069 | 3/2000 |
| JP | 2006-123887 | 5/2006 |
| JP | 2006-347265 | 12/2006 |

OTHER PUBLICATIONS

International Search Report for parent PCT application No. PCT/JP2008/063206.
Written Opinion for parent PCT application No. PCT/JP2008/063206 dated Oct. 21, 2008, including English translation of patentability objections.
English translation of International Preliminary Report on Patentability for parent PCT application No. PCT/JP2008/063206.

* cited by examiner

*Primary Examiner* — Lori L Lyjak
(74) *Attorney, Agent, or Firm* — J-Tek Law PLLC; Jeffrey D. Tekanic

(57) ABSTRACT

An impact absorbing member comprises a first main body and a second main body. The first main body comprises a first partial tube wall and first flange members. The second main body comprises a second partial tube wall and second flange members. The first flange members are joined with the respective second flange members in a discontinuous manner along the axial direction of the tube. In at least one segment where the first flange members and the second flange members are not joined in the axial direction of the tube, spaces are formed between ends part of a first partial tube wall side of the first flange members and end parts of a second partial tube wall side of the second flange members.

6 Claims, 6 Drawing Sheets

IMPACT ABSORBING MEMBER

CROSS-REFERENCE

This application is the US national stage of International Patent Application No. PCT/JP2008/063206 filed on Jul. 23, 2008.

TECHNICAL FIELD

The present invention relates to an impact absorbing member that is used by being installed in a vehicle, which impact absorbing member compressively deforms in an axial direction during a vehicle collision and absorbs impact energy.

BACKGROUND ART

Patent Document 1 discloses an impact absorbing member comprising a tube wall that constitutes a tube, and flange members extending outward from the outer circumference of the tube wall and also extending in the axial direction of the tube. In case this impact absorbing member is subjected to a compressive load in the axial direction during a vehicle collision, the tube wall and flange members compressively deform along the axial direction by buckling deformation. This impact absorbing member comprises a first main body and a second main body. Each of the first main body and second main body comprises a partial tube wall, which divides the tube wall in the circumferential direction, and flange members extending from both ends outwardly of the tube with respect to the circumferential direction of the partial tube wall; the flange members also extend in the axial direction of the tube. The impact absorbing member is formed by joining the flange members of the first main body with the flange members of the second main body. The flange members of the first main body and the flange members of the second main body are joined together along their entire surfaces.

Patent Document 1: Japanese Patent Application Publication No. 2000-81069

DISCLOSURE OF THE INVENTION

Problem to be Solved by the Invention

In the impact absorbing member of the above-mentioned Patent Document 1, the deformation process during the compressive deformation (e.g., the location where buckling occurs or the circumstances during the deformation) is not consistent. Consequently, even if impact absorbing members are manufactured in the same shape, the deformation process is not necessarily the same. As a result, the relationship between the compressive load on the impact absorbing member and the degree of compressive deformation is not consistent and large variations between products result.

The present invention was made in light of the above-described circumstances, and seeks to offer, in an impact absorbing member comprising a tube wall and flange members, a technique that reduces variations between products with respect to the relationship between the compressive load on the impact absorbing member and the degree of compressive deformation.

In one aspect of the present teachings, an impact absorbing member comprises a tube wall and flange members. The tube wall constitutes a tube. The flange members extend outward from an outer circumference of the tube wall and also extend in an axial direction of the tube. This impact absorbing member may be used by installing one axial end on the main body of a vehicle. During a vehicle collision, the tube wall and the flange members of the impact absorbing member will compressively deform along the axial direction.

The impact absorbing member further comprises at least a first main body and a second main body. The first main body comprises a first partial tube wall and first flange members. The first partial tube wall constitutes a partial tube wall that divides the tube wall in a circumferential direction. The first flange members extend from both ends to the outer parts of the tube with respect to the circumferential direction of the first partial tube wall, and also extend in the axial direction of the tube. The second main body comprises a second partial tube wall and second flange members. The second partial tube wall constitutes a partial tube wall that divides the tube wall in the circumferential direction. The second flange members extend from both ends to the outer parts of the tube with respect to the circumferential direction of the second partial tube wall, and also extend in the axial direction of the tube. The first flange members and the second flange members are joined in a discontinuous manner along the axial direction of the tube. In at least one of the segments where the first flange members and the second flange members are not joined in the axial direction of the tube, spaces are formed between end parts of a first partial tube wall side of the first flange members and end parts of a second partial tube wall side of the second flange members.

To reduce variations with respect to the relationship between the compressive load on the impact absorbing member and the degree of compressive deformation, it is important to reduce variations in the circumstances of the deformation and the buckling location of the flange member. In this impact absorbing member, spaces are formed at prescribed locations in the axial direction between the end parts of the first partial tube wall side of the first flange members and the end parts of the second partial tube wall side of the second flange members. The first flange members and the second flange members are not joined at the locations where these spaces are formed. When a compressive load is applied in the axial direction of the impact absorbing member, the tube wall deforms so that it closes the spaces in the axial and circumferential directions of the tube body, which spaces are formed between the end parts of the first partial tube wall side of the first flange members and the end parts of the second partial tube wall side of the second flange members. An outer end part of the first flange member and an outer end part of the second flange member thereby move away from each other at the locations where the spaces are formed, and the outer end part of the first flange member and the outer end part of the second flange member deform in an opening direction. The first flange member and second flange member thereby begin to deform at the same location (the location where the space is formed). In case a further compressive load is applied while in this state, further deformation occurs at the location(s) where the deformation had already started; both flange members buckle and are compressed in the axial direction of the tube.

According to this impact absorbing member, the buckling advances sequentially at the locations where the spaces are formed. Junction points between the first flange members and second flange members remain in the same plane before and after buckling. That is, the deformation process of the impact absorbing member is stabilized.

According to this impact absorbing member, variations between products in the location(s) where the buckling of the flange members occurs, as well as variations in the circumstances of the deformation or the deformation process, can be reduced. Variations between products with respect to the relationship between the compressive load on the impact absorbing member and the degree of compressive deformation may thereby be reduced.

In this impact absorbing member, it is preferred that one space is formed in each of the segments where the first flange members and the second flange members are not joined in the axial direction of the tube. It is preferred that the space(s) located farthest from the main body of the vehicle is (are) larger than the other spaces.

In the impact absorbing member, during the initial stage of the application of the compressive load, a large load is applied close to the location where the load is acting, i.e. a location farthest from the main body of the vehicle. In this impact absorbing member, the space(s) farthest from the main body of the vehicle may be larger than the other spaces. Consequently, the space(s) farthest from the main body of the vehicle yield(s) to deformation more easily than the other spaces. Variations in the deformation location(s) of the flange members during the initial application of the compressive load may thereby be reduced. Consequently, variations between products with respect to the relationship between the compressive load on the impact absorbing member and the degree of compressive deformation may be reliably reduced.

In this impact absorbing member, it is preferred that the spaces become smaller as they become more distant from the tube wall.

According to this configuration, the outer end part of the first flange member and the outer end part of the second flange member easily move apart. That is, the first flange member and the second flange member easily deform at the location(s) where the space(s) is(are) formed. As a result, the flange members may be more reliably caused to deform at the desired location(s).

Thus, in preferred aspects of the present teachings, variations between impact absorbing members with respect to the relationship between the compressive load on the impact absorbing member and the degree of compressive deformation can be reduced. Variations in the impact energy absorption performance of the impact absorbing members between products can thereby be reduced.

BEST MODE FOR CARRYING OUT THE INVENTION

Some technical features of the present invention will be enumerated below.

(First feature) The impact absorbing member may further comprise a third main body in addition to the first main body and the second main body. In this case, the third main body may comprise a third partial tube wall constituting a partial tube wall, which divides the tube wall in the circumferential direction, and a pair of third flange members formed at each of both ends in the circumferential direction of the third partial tube wall.

In this case, the second flange members may join with the first flange members. The third flange members may join with the second flange members. The first flange members may join with the third flange members. The tube may be comprised of the first partial tube wall, the second partial tube wall and the third partial tube wall.

(Second feature) A fourth main body, a fifth main body, etc. may be provided. The number of members constituting the tube wall may be varied as desired.

(Third feature) In case there are three members constituting the tube wall, the first flange members and the third flange members may be joined in a discontinuous manner in the axial direction of the tube. The second flange members and the third flange members may be joined in a discontinuous manner in the axial direction of the tube. In a portion of a segment where the first flange members and the third flange members are not joined in the axial direction of the tube, a space may be formed between the end part of the first partial tube wall side of the first flange member and the end part of the third partial tube wall side of the third flange member. In a portion of a segment where the second flange member and the third flange member are not joined in the axial direction of the tube, a space may be formed between the end part of the second partial tube wall side of the second flange member and the end part of the third partial tube wall side of the third flange member. According to this configuration, variations between impact absorbing members with respect to the relationship between the compressive load on the impact absorbing member and the degree of compressive deformation can be reduced.

(Fourth feature) One space between the first flange member and the second flange member (the space between a pair of joined flange members) may be formed for each of the non-joined segments, or two or more spaces per such segments may be formed. Further, the number of spaces per segment may differ among the segments. Further, segments without a space may be present. According to these configurations as well, variations between impact absorbing members with respect to the relationship between the compressive load on the impact absorbing member and the degree of compressive deformation can be reduced.

Figure 1:
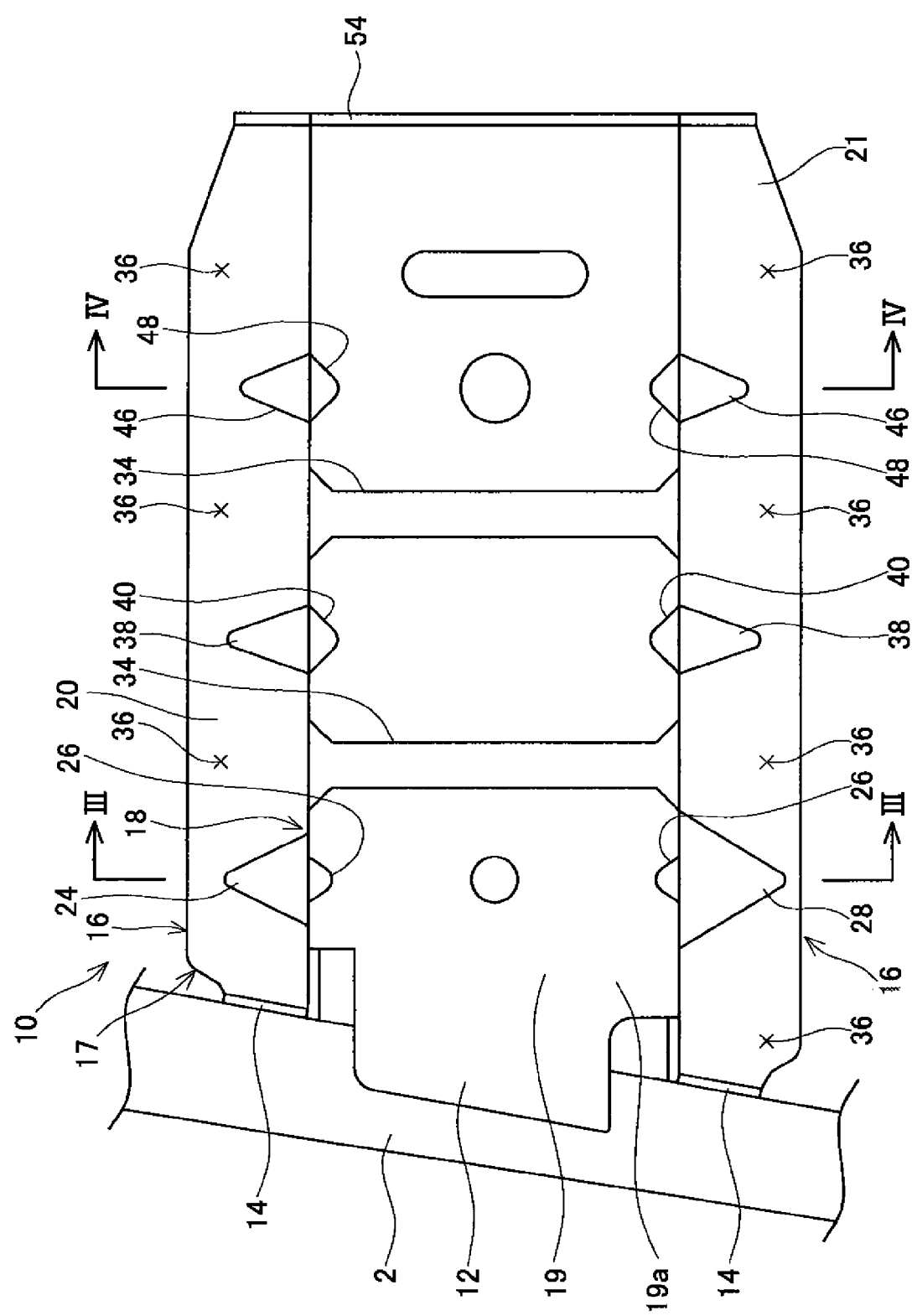
FIG. 1 is a plan view of an impact absorbing member of a principle embodiment.
Figure 2:
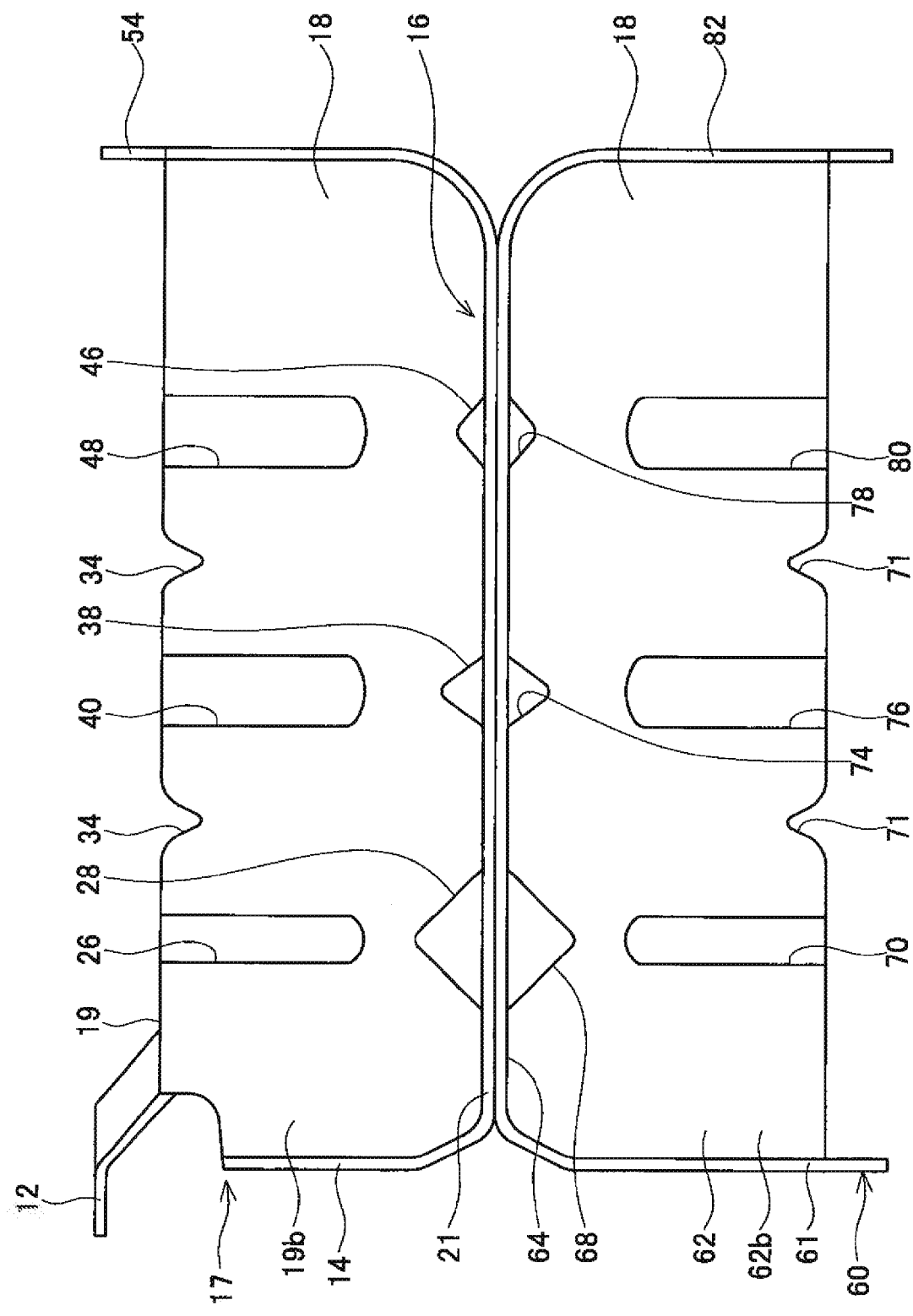
FIG. 2 is a side view of the impact absorbing member of the principle embodiment.
Figure 3:
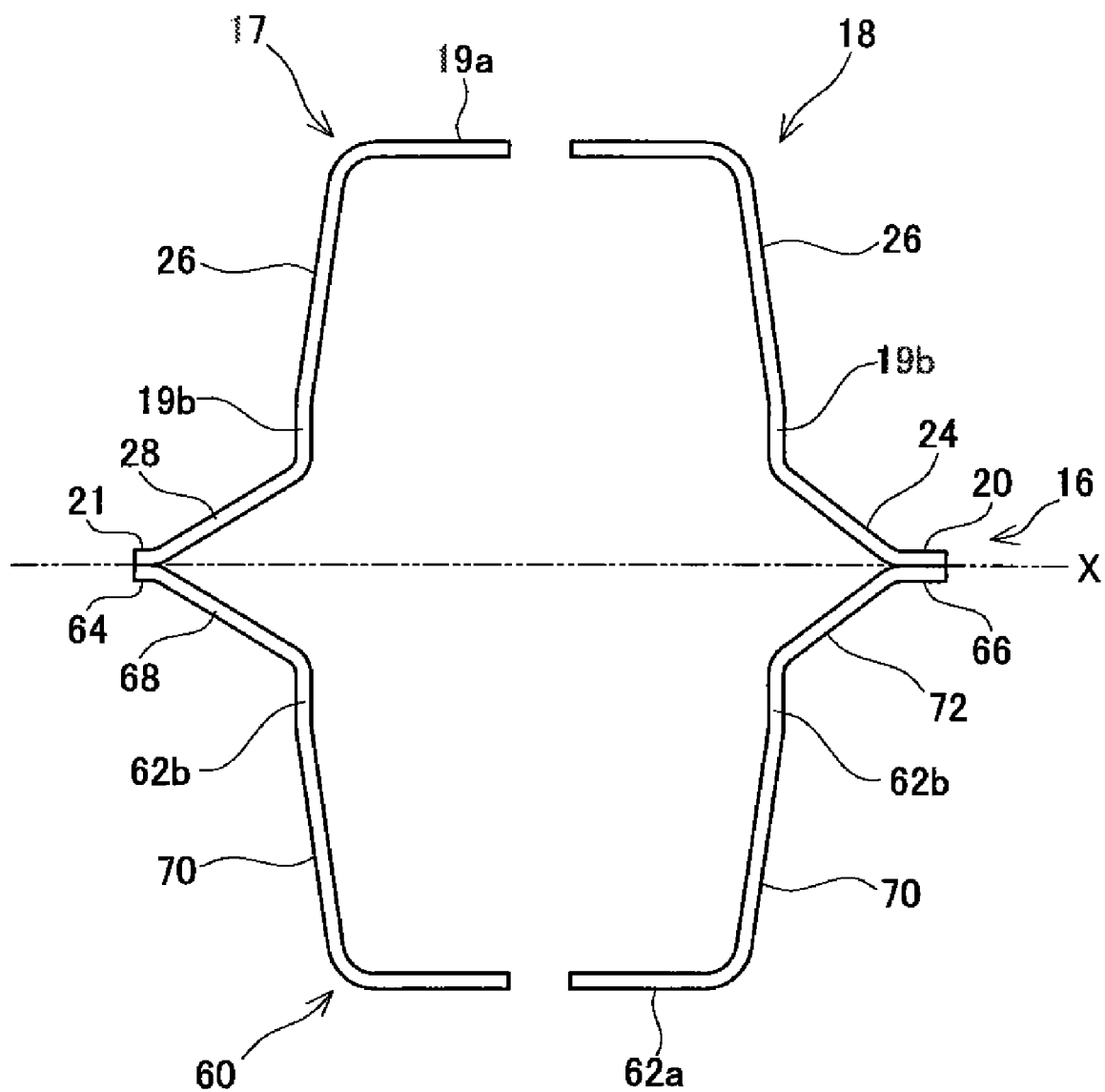
FIG. 3 is a cross-sectional view along the cross-section III-III of FIG. 1.

An impact absorbing member of the present embodiment, by which the present invention may be realized, will be explained with reference to the Figures. FIG. 1 is a plan view of an impact absorbing member 10 of the principle embodiment. FIG. 2 is a side view of the impact absorbing member 10. FIG. 3 is a cross-sectional view along the cross-section III-III of FIG. 1.

For example, the impact absorbing member 10 can be installed at the front and rearward ends of a vehicle, such as an automobile. In the principle embodiment, an impact absorbing member 10, which is installed on the front side of a vehicle, will be described.

As shown in FIGS. 1, 2 and 3, the impact absorbing member 10 comprises a tube wall 18 and flange members 16. The tube wall 18 constitutes a quadrilateral tube. The flange members 16 extend outward from the outer circumference of the tube wall 18. The flange members 16 also extend in the axial direction of the tube wall 18.

The impact absorbing member 10 comprises a first main body 17 and a second main body 60.

The first main body 17 comprises a first partial tube wall 19 and first flange members 20, 21. The first partial tube wall 19 includes an upper wall 19a and two first side walls 19b. The first side walls 19b extend downward from left and right ends of the upper wall 19a (the two ends of the direction perpendicular to the axial direction of the tube wall 18). The first partial tube wall 19 forms an upper half of the tube wall 18. An upper flange member 12 and a front flange member 14 are formed at the front end (the front end in the vehicle's direction of movement) in the axial direction of the first partial tube wall 19. The upper flange member 12 and the front flange member 14 are connected to a front bumper 2 of the vehicle. The upper flange member 12 is connected to an upper surface of the front bumper 2. The upper flange member 12 is joined to the front bumper 2 by spot welding. The front flange member 14 is connected to the rear surface of the front bumper 2. The front flange member 14 is joined to the front bumper 2 by spot welding. A rear flange member 54 is formed at the rearward end of the first partial tube wall 19 (the rearward end in the vehicle's direction of movement). The rear flange member 54 is connected to the main body of the vehicle, e.g., a side member. The rear flange member 54 is joined to the main body of the vehicle by spot welding.

Two upper grooves 34, which are indented towards the lower side, are formed in the upper wall 19a of the first partial tube wall 19. The two upper grooves 34 are parallel to each other with a space between the two in the axial direction of the tube wall 18. Each of the upper grooves 34 is perpendicular to the axial direction of the tube wall 18. Each of the upper grooves 34 is formed across the entire width of the upper wall 19a in the widthwise direction (the direction perpendicular to the axial direction of the tube wall 18).

In each of the first side walls 19b, an upper vertical groove 26 is formed forward of the forwardmost upper groove 34. The upper vertical grooves 26 are indented towards the interior of the tube wall 18. Both upper vertical grooves 26 are formed at the same location with respect to the axial direction of the tube wall 18. The upper vertical grooves 26 extend downward from each upper end of the first side walls 19b.

The lower end of each upper vertical groove 26 is located above the lower end of each first side wall 19b. An upper vertical groove 40 is formed in each of the first side walls 19b between the two upper grooves 34. The upper vertical grooves 40 are indented towards the interior of the tube wall 18. The upper vertical grooves 40 are parallel to the upper vertical grooves 26. The length of the upper vertical grooves 40 in the vertical direction is approximately the same as the length of the upper vertical grooves 26 in the vertical direction. The width and depth of the upper vertical grooves 40 are greater than those of the upper vertical grooves 26. Further, in each of the first side walls 19b, an upper vertical groove 48 is formed rearward of the rearmost upper groove 34. The upper vertical grooves 48 are parallel to the upper vertical grooves 26. The length of the upper vertical grooves 48 in the vertical direction is approximately the same as the length of the upper vertical grooves 26 in the vertical direction. The width and depth of the upper vertical grooves 48 are approximately the same as those of the upper vertical grooves 40.

The first flange member 20 is formed at the lower end of one of the first side walls 19b. The first flange member 20 extends to the outer part of the tube wall 18. Further, the first flange member 20 extends along the axial direction of the tube wall 18. The first flange member 21 is formed at the lower end of the other of the first side walls 19b. The first flange member 21 extends to the outer part of the tube wall 18. Further, the first flange member 21 extends along the axial direction of the tube wall 18. The first flange member 21 is longer than the first flange member 20 in the axial direction of the tube wall 18. Further, the first flange member 21 has approximately the same length as the first flange member 20 in the direction perpendicular to the axial direction of the tube wall 18. The front ends of the first flange members 20, 21 connect to the front flange member 14. The rearward ends of the first flange members 20, 21 connect to the rear flange member 54.

An upper first bead 28 is formed on the first flange member 21 below the upper vertical groove 26. The upper first bead 28 has a triangular shape in the axial cross-section of the tube wall 18. As shown in FIG. 3, the height of the upper first bead 28 gradually decreases as it goes towards the outer part of the first tube wall 18 from the end of the upper first bead 28 on the first side wall 19b side of the first flange member 21. An upper second bead 24 is formed on the first flange member 20 below the upper vertical groove 26. The upper second bead 24 is formed in the same location as the upper first bead 28 in the axial direction of the tube wall 18. The upper second bead 24 has a triangular shape in the axial cross-section of the tube wall 18. As shown in FIG. 3, the height of the upper second bead 24 gradually decreases as it goes towards the outer part of the first tube wall 18 from the end of the upper second bead 24 on the first side wall 19b side of the first flange member 20. The dimensions of the upper second bead 24 (the height in the vertical direction, the width in the axial direction of the tube wall 18, and the length in the direction perpendicular to the axial direction of the tube wall 18) are smaller than those of the upper first bead 28.

An upper third bead 38 is formed on each of the first flange members 20, 21 below the upper vertical groove 40. The upper third bead 38 has a triangular shape in the axial cross-section of the tube wall 18. The height of the upper third bead 38 gradually decreases as it goes towards the outer part of the first tube wall 18 from the end of the upper third bead 38 on the first side wall 19b side of the first flange members 20, 21. The upper third beads 38 are formed in the same location in the axial direction of the tube wall 18. Further, the upper third beads 38 have the same shape and dimensions. The dimensions of the upper third bead 38 are smaller than those of the upper second bead 24.

An upper fourth bead 46 is formed on each of the first flange members 20, 21 below the upper vertical groove 48. The upper fourth bead 46 has a triangular shape in the axial cross-section of the tube wall 18. The height of the upper fourth bead 46 gradually decreases as it goes towards the outer part of the first tube wall 18 from the end of the upper fourth beads 46 on the first side wall 19b side of the first flange members 20, 21. The upper fourth beads 46 are formed in the same location in the axial direction of the tube wall 18. Further, the upper fourth beads 46 have the same shape and dimensions. The dimensions of the upper fourth beads 46 are smaller than those of the upper third beads 38. The dimensions of the upper fourth beads 46 may be the same as those of the upper third beads 38.

As shown in FIG. 2, the second main body 60 is disposed below the first main body 17. As shown in FIG. 3, the second main body 60 comprises a second partial tube wall 62 and second flange members 64, 66. The second partial tube wall 62 is comprised of a lower wall 62a and two second side walls 62b. The second side walls 62b extend upward from the left and right ends of the lower wall 62a. The second partial tube wall 62 forms a lower half of the tube wall 18. The quadrilateral tube is comprised of the first partial tube wall 19 and the second partial tube wall 62 of the tube wall 18. As shown in FIG. 2, a front flange member 61 connected to the front bumper 2 is formed on the front side of the second partial tube wall 62. The front flange member 61 is connected to the rear surface of the front bumper 2. The front flange member 61 is joined to the front bumper 2 by spot welding. A rear flange member 82 is formed at a rearward end of the second partial tube wall 62. The rear flange member 82 is connected to the main body of the vehicle. The rear flange member 82 is joined to the main body of the vehicle by spot welding.

Two lower grooves 71, which are indented towards the upper side, are formed in the lower wall 62a of the second partial tube wall 62. The two lower grooves 71 are parallel to each other with a space between the two in the axial direction of the tube wall 18. Each of the lower grooves 71 is perpendicular to the axial direction of the tube wall 18. Each of the lower grooves 71 is formed across the entire width of the lower wall 62a in the widthwise direction. Each lower groove 71 is disposed so as to oppose the corresponding upper groove 34 formed in the upper wall 19a.

In each of the second side walls 62b, a lower vertical groove 70 is formed forward of the forwardmost lower groove 71. The lower vertical grooves 70 are indented towards the interior of the tube wall 18. The lower vertical grooves 70 formed in the second side walls 62b are formed at the same location with respect to the axial direction of the tube wall 18. Further, each lower vertical groove 70 is formed at a location corresponding to the respective upper vertical groove 26 formed in the first side walls 19b. The lower vertical grooves 70 extend upward from the lower ends of the second side walls 62b. The upper ends of the lower vertical grooves 70 are located below the upper ends of the second side walls 62b. The lower vertical grooves 70 have approximately the same width, depth, and length in the vertical direction as the upper vertical grooves 26.

A lower vertical groove 76 is formed between the two lower grooves 71 in each of the second side walls 62b. The lower vertical grooves 76 are indented towards the interior of the tube wall 18. The lower vertical grooves 76 are formed parallel to the lower vertical grooves 70. Each of the lower vertical grooves 76 formed in the second side walls 62b is formed at the same location with respect to the axial direction of the tube wall 18. Further, each of the lower vertical grooves 76 is formed at a location corresponding to the respective upper vertical grooves 40 formed in the first side wall 19b. The lower vertical grooves 76 extend upward from the lower ends of the second side walls 62b. The length of the lower vertical grooves 76 in the vertical direction is approximately the same as that of the lower vertical grooves 70. The width and depth of the lower vertical grooves 76 are greater than those of the lower vertical grooves 70, and are approximately the same as those of the upper vertical grooves 40. Further, a lower vertical groove 80 is formed in each of the second side walls 62b rearward of the rearwardmost lower groove 71. The lower vertical grooves 80 are indented towards the interior of the tube wall 18. The lower vertical grooves 80 are parallel to the lower vertical grooves 70. The lower vertical grooves 80 formed in the second side walls 62b are formed at the same location with respect to the axial direction of the tube wall 18. Further, each lower vertical groove 80 is formed at a location corresponding to the respective upper vertical grooves 48 formed in the first side walls 19b. The lower vertical grooves 80 extend upward from the lower ends of the second side walls 62b. The length of the lower vertical grooves 80 is approximately the same as that of the lower vertical grooves 70. The width and depth of the lower vertical grooves 80 are approximately the same as those of the upper vertical grooves 48.

The second flange member 64 is formed at the upper end of one of the second side walls 62b. The second flange member 64 extends to the outer part of the tube wall 18. Further, the second flange member 64 extends along the axial direction of the tube wall 18. The second flange member 64 opposes the first flange member 21. The second flange member 66 is formed at the upper end of the other of the second side walls 62b. The second flange member 66 extends to the outer part of the tube wall 18. Further, the second flange member 66 extends along the axial direction of the tube wall 18. The second flange member 66 opposes the first flange member 20. The second flange member 64 is longer than the second flange member 66. The second flange member 64 has approximately the same length as the first flange member 21 in the axial direction of the tube wall 18. The second flange member 66 has approximately the same length as the first flange member 21 in the axial direction of the tube wall 18. Further, the second flange member 64 has approximately the same length as the second flange member 66 and the first flange member 21 in the direction perpendicular to the axial direction of the tube wall 18. The front ends of the second flange members 64, 66 connect to the front flange member 61. The rearward ends of the second flange members 64, 66 connect to the rear flange member 82.

A lower first bead 68 is formed on the second flange member 64 above the lower vertical groove 70. The lower first bead 68 is formed below the upper first bead 28. The lower first bead 68 has a shape and dimensions symmetric to those of the upper first bead 28 with respect to an abutment surface X (see FIG. 3) of the first main body 17 and the second main body 60. The upper first bead 28 and the lower first bead 68 form a space between the end part of the first side wall 19b side of the first flange member 21 and the end part of the second side wall 62b side of the second flange member 64.

A lower second bead 72 is formed on the second flange member 66 above the lower vertical groove 70. The lower second bead 72 is formed below the upper second bead 24. The lower second bead 72 has a shape and dimensions symmetric to those of the upper second bead 24 with respect to the abutment surface X. The upper second bead 24 and lower second bead 72 form a space between the end part of the first side wall 19b side of the first flange member 20 and the end part of the second side wall 62b side of the second flange member 66.

A lower third bead 74 is formed on each of the second flange members 64, 66 above the lower vertical groove 76. Each of the lower third beads 74 is formed below the respective upper third bead 38. The lower third bead 74 has a shape and dimensions symmetric to those of the upper third bead 38 with respect to the abutment surface X. The upper third bead 38 and the lower third bead 74 form a space between the end part of the first side wall 19b side of the first flange member 21 and the end part of the second side wall 62b side of the second flange member 64. Further, the upper third bead 38 and the lower third bead 74 form a space between the end part of the first side wall 19b side the first flange member 20 and the end part of the second side wall 62b side of the second flange member 66.

Figure 4:
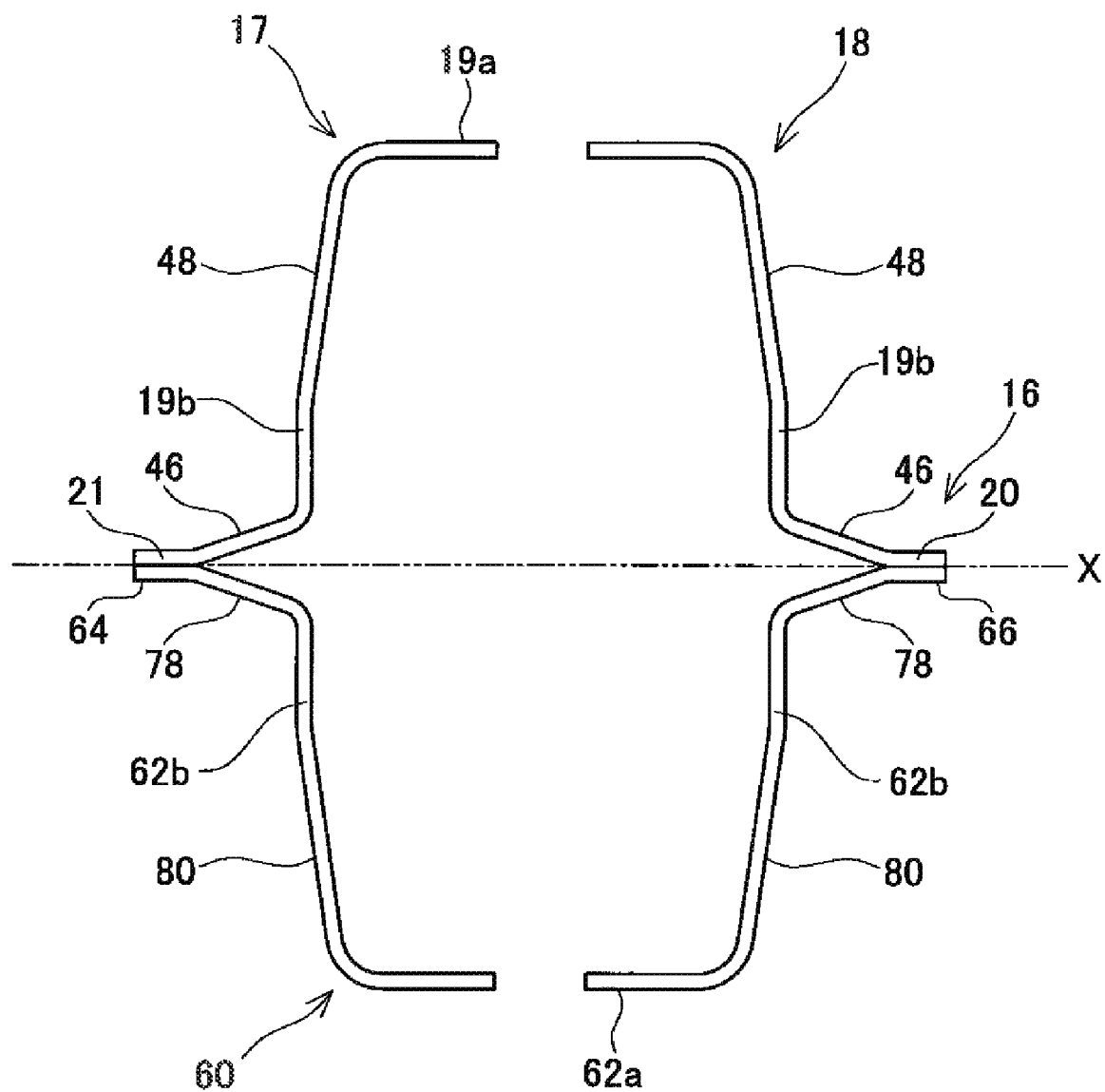
FIG. 4 is a cross-sectional view along the cross-section IV-IV of FIG. 1.

FIG. 4 is a cross-sectional view along the cross-section IV-IV of FIG. 1. As shown in FIG. 4, a lower fourth bead 78 is formed on each of the second flange members 64, 66 above the lower vertical groove 80. Each of the lower fourth beads 78 is formed below the respective upper fourth bead 46. The lower fourth bead 78 has a shape and dimensions symmetric to those of the fourth bead 46 with respect to the abutment surface X. The upper fourth bead 46 and the lower fourth bead 78 form a space between the end part of the first side wall 19b side of the first flange member 21 and the end part of the second side wall 62b side of the second flange member 64. Further, the upper fourth bead 46 and the lower fourth bead 78 form a space between the end part of the first side wall 19*b* side of the first flange member 20 and the end part of the second side wall 62*b* side of the second flange member 66.

The dimensions of the beads 68, 72, 74, 78 become smaller in the order of: the lower first bead 68, the lower second bead 72, the lower third bead 74, the lower fourth bead 78. The dimensions of the lower third bead 74 may be the same as those of the lower fourth bead 78.

As shown in FIG. 1, the first flange member 21 and the second flange member 64 are joined by spot welding at four joining points 36. The joining points 36 are respectively located, with respect to the axial direction of the tube wall 18, in a forward end part of the first flange member 21, between the first beads 28, 68 and the third beads 38, 74, between the third beads 38, 74 and the fourth beads 46, 78, and in a rearward end portion of the first flange member 21. The beads 28, 38, 46, 68, 74, 78 are formed, with respect to the axial direction of the tube wall 18, in the segments where the first flange member 21 and the second flange member 64 are not joined. That is, the spaces between the end part of the first side wall 19*b* side of the first flange member 21 and the end part of the second side wall 62*b* side of the second flange member 64 are formed in the segments where the first flange member 21 and the second flange member 64 are not joined. Further, the joining points 36 located between the beads are at the same locations as the upper grooves 34 (lower grooves 71) with respect to the axial direction of the tube wall 18.

The first flange member 20 and the second flange member 66 are joined by spot welding at three joining points 36. The joining points 36 are located between the second beads 24, 72 and the third beads 38, 74, between the third beads 38, 74 and the fourth beads 46, 78, and in the rearward end portion of the first flange member 20. The beads 28, 38, 46, 68, 74, 78 are formed, with respect to the axial direction of the tube wall 18, in the segments where the first flange member 20 and the second flange member 66 are not joined. That is, the spaces between the end part of the first side wall 19*b* side of the first flange member 20 and the end part of the second side wall 62*b* side of the second flange member 66 are formed in the segments where the first flange member 20 and the second flange member 66 are not joined. Further, the joining points 36 located between the beads are at the same locations as the upper grooves 34 (lower grooves 71) with respect to the axial direction of the tube wall 18.

If an object collides with the front side of the vehicle while the impact absorbing member 10 is installed on the main body of the vehicle, the impact absorbing member 10 absorbs the impact energy as a result of the impact absorbing member 10 compressively deforming in the axial direction of the tube wall 18. During the initial application of the compressive load to the impact absorbing member 10, it deforms in the direction that closes the space formed by the first beads 28, 68 due to the upper and lower vertical grooves 26, 70 being indented towards the interior of the tube wall 18. Consequently, the outer end parts of the first flange member 21 and the second flange member 64 separate from each other at the location where the space is formed (the location where the first beads 28, 68 are formed). Similarly, it deforms in the direction that closes the space formed by the second beads 24, 72, and the outer end parts of the first flange member 20 and the second flange member 66 separate from each other at the location where the space is formed (the location where the second beads 24, 72 are formed). The flange members 20, 21, 64, 66 begin to deform at the locations where the spaces are formed. It is thus possible to specify the locations where the deformation will occur when the compressive load is initially applied to the flange members. In case a further compressive load is applied while in this state, the flange members 20, 21, 64, 66 further deform at the locations where the deformation had already begun, and they compressively buckle. A similar phenomenon also occurs at the locations where the third beads 38, 74 are formed and where the fourth beads 46, 78 are formed. The locations where the flange members 20, 21, 64, 66 are joined by the joining points 36 remain in the same plane after the compressive buckling as before the compressive buckling. Consequently, it is possible to reduce variations between products in the location where the compressive buckling of the flange members 16 occurs, as well as in the circumstances of the deformation and in the deformation process. It is thereby possible to reduce variations between products with respect to the relationship between the compressive load on the impact absorbing member 10 and the degree of compressive deformation.

During the initial application of the compressive load, the load is the greatest at the location where the load acts, i.e. the front side of the vehicle. In the impact absorbing member 10, the beads 24, 28, 68, 72 that are located on the front end side with respect to the axial direction of the tube wall 18 are larger than the beads located on the rearward end side with respect to the axial direction of the tube wall 18. Consequently, in the impact absorbing member 10, the side at the front of the vehicle readily deforms. It is thereby possible to prevent variations between products in the locations where the deformation of the flange members 16 occurs during the initial application of the compressive load.

Further, in the impact absorbing member 10, the upper vertical grooves 26, 40, 48 are each formed in the first side walls 19*b* at locations that correspond to the beads 24, 28, 38, 46 formed in the first flange members 20, 21. Further, the lower vertical grooves 70, 76, 80 are each formed in the second side walls 62*b* at locations that correspond to the beads 68, 72, 74, 78 formed in the second flange members 64, 66. When the impact absorbing member 10 is compressively deformed by the compressive load, the first side walls 19*b*, 62*b* readily deform towards the interior of the tube wall 18 at the locations where the upper vertical grooves 26, 40, 48 and the lower vertical grooves 70, 76, 80 are formed. Variations between products in the circumstances of the deformation and the deformation process of the impact absorbing member 10 can thereby be suppressed.

Further, in the impact absorbing member 10, the upper grooves 34 are formed in the upper wall 19*a* and the lower grooves 71 are formed in the lower wall 62*a*. The upper grooves 34 are disposed so as to be spaced from the upper vertical grooves 26, 40, 48 with respect to the axial direction of the tube wall 18. The lower grooves 71 are disposed so as to be spaced from the lower vertical grooves 70, 76, 80 with respect to the axial direction of the tube wall 18. When the impact absorbing member 10 is deformed by a load, the upper wall 19*a* and lower wall 62*a* readily deform towards the interior of the tube wall 18 into a concave shape at the locations where the upper grooves 34 and lower grooves 71 are formed. Further, at the locations where the upper vertical grooves 26, 40, 48, 70, 76, 80 are formed, the upper walls 19*a*, 62*a* readily deform toward the outer parts of the tube into a convex shape due to the first side walls 19*b*, 62*b* being indented towards the interior of the tube wall 18. Variations between products in the circumstances of the deformation or the deformation process of the compressive deformation of the tube wall 18 can thereby be suppressed.

Modified examples of the impact absorbing member 10 will be enumerated.

In the impact absorbing member 10, the upper first bead 28 formed on the first flange member 21 is disposed at the same location as the upper second bead 24 formed on the first flange member 20 with respect to the axial direction of the tube wall 18. However, the location of the upper first bead 28 and the upper second bead 24 may differ with respect to the axial direction of the tube wall 18. Similarly, the beads that are formed on the impact absorbing member 10 at the same locations with respect to the axial direction of the tube wall 18 may be formed at different locations.

In the impact absorbing member 10, the joining points 36 of the first flange member 20 and second flange member 66 and the joining points 36 of the first flange member 21 and second flange member 64 are disposed in the same locations with respect to the axial direction of the tube wall 18. However, the joining points 36 of the first flange member 20 and second flange member 66 and the joining points 36 of the first flange member 21 and second flange member 64 may be disposed in different locations with respect to the axial direction of the tube wall 18.

Figure 5:
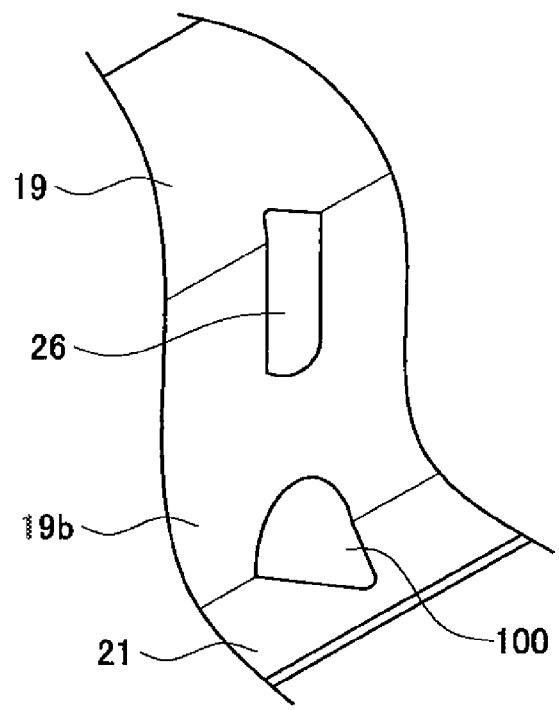
FIG. 5 is a perspective view of one portion of a modified example of the impact absorbing member.
Figure 6:
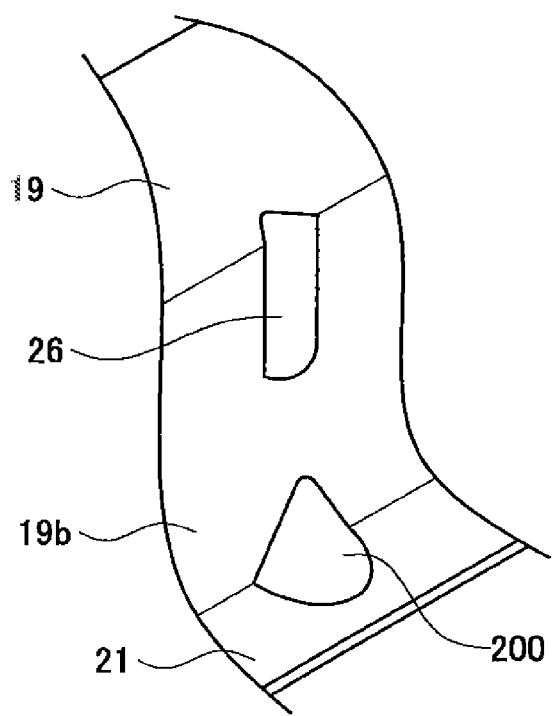
FIG. 6 is a perspective view of one portion of a modified example of the impact absorbing member.
Figure 7:
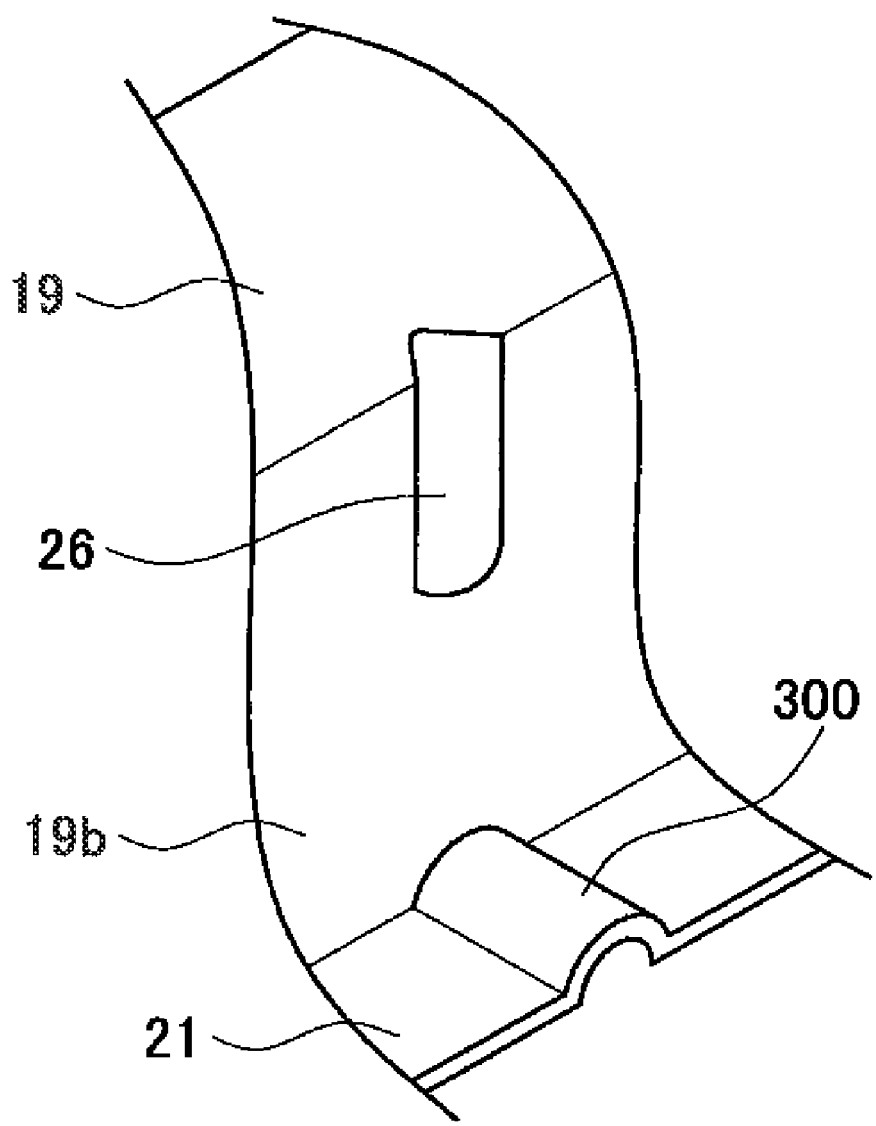
FIG. 7 is a perspective view of one portion of a modified example of the impact absorbing member.

Furthermore, the locations, dimensions and shapes of the beads may be changed depending on the required amount of strength, deformation, etc. For example, with respect to the shape of the bead, a bead 100 may have a half-cone shape as shown in FIG. 5, wherein its base surface is located on the first side wall 19b, and it extends towards an outer part of the first partial tube wall 19. Alternatively, e.g., as shown in FIG. 6, a bead 200 may have a half-cone shape, wherein its base surface is located on the first flange member 21, and it extends along the first side wall 19b. Alternatively, as shown in FIG. 7, a bead 300 may have a half-cylinder shape that extends towards the outer part of the first partial tube wall 19.

Further, the shape of all the beads may be identical; alternately, some of the beads may have (a) different shape(s) from the other beads.

Further, in the impact absorbing member 10, the tube wall 18 forms a quadrilateral tube. However, the tube formed by the tube wall need not be a quadrangle. It may, e.g., be round, or a polygonal shape other than quadrilateral: e.g., hexagonal, octagonal, etc.

A specific example of the present invention is described in detail above, but this merely illustrates some possibilities of the teachings and does not restrict the scope of the claims. The technology set forth in the claims includes variations and modifications of the specific example set forth above.

Further, the technical elements disclosed in the specification or the drawings have technical utility separately or in all types of combinations, and are not limited to the combinations set forth in the claims at the time of filing of the application. Furthermore, the technology disclosed in the specification or the drawings may be utilized to simultaneously achieve a plurality of aims, and has technical utility by achieving any single aim.

The invention claimed is:

1. An impact absorbing member comprising a tube wall constituting a tube, and flange members extending outwardly from an outer circumference of the tube wall and also extending in an axial direction of the tube, wherein the impact absorbing member is used by installing one axial end on a main body of a vehicle, and the tube wall and the flange members compressively deform along the axial direction during a vehicle collision, the impact absorbing member comprising:
at least a first main body and a second main body, wherein:
the first main body comprises a first partial tube wall constituting a partial tube wall that divides the tube wall in a circumferential direction, and first flange members extending from both ends to outer parts of the tube with respect to the circumferential direction of the first partial tube wall, and also extending in the axial direction of the tube,
the second main body comprises a second partial tube wall constituting a partial tube wall that divides the tube wall in the circumferential direction, and second flange members extending from both ends to the outer parts of the tube with respect to the circumferential direction of the second partial tube wall, and also extending in the axial direction of the tube,
the first flange members and the second flange members are joined in a discontinuous manner with respect to the axial direction of the tube,
a first bead and a second bead are located in at least one segment where the first flange members and the second flange members are not joined in the axial direction of the tube, wherein the first bead, which projects in a direction away from the second flange member, is located on an end part of a first partial tube wall side of the first flange member, and the second bead, which projects in a direction away from the first flange member, is located on an end part of a second partial tube wall side of the second flange member,
the first bead and the second bead are located at a same position in the axial direction of the tube and a shape and dimensions of the first and second beads are symmetric with respect to an abutment surface of the first flange member and the second flange member, and
the first bead and the second bead form a space between the end part of the first partial tube wall side of the first flange member and the end part of the second partial tube wall side of the second flange member.

2. The impact absorbing member as in claim 1, wherein:
one space is formed in each segment, and
a space located farthest from the main body of the vehicle is larger than other spaces.

3. The impact absorbing member as in claim 2, wherein:
the spaces become smaller as they become more distant from the tube wall.

4. The impact absorbing member as in claim 3, wherein:
the first bead and the second bead have a cross-section in the axial direction that is one of triangular and half-cylindrical.

5. The impact absorbing member as in claim 1, wherein:
the spaces become smaller as they become more distant from the tube wall.

6. The impact absorbing member as in claim 1, wherein:
the first bead and the second bead have a cross-section in the axial direction that is one of triangular and half-cylindrical.

* * * * *